UNITED STATES PATENT OFFICE.

DAVID CHIDLOW, OF WASHINGTON, DISTRICT OF COLUMBIA.

COMPOSITION FOR USE IN BREAD-MAKING.

976,343.   Specification of Letters Patent.   Patented Nov. 22, 1910.

No Drawing.   Application filed July 29, 1909. Serial No. 510,253.

*To all whom it may concern:*

Be it known that I, DAVID CHIDLOW, a subject of the King of Great Britain, residing at Washington, in the District of Columbia, have invented certain new and useful Improvements in Composition for Use in Bread-Making, of which the following is a specification.

My present invention relates to the preparation of a composition of matter for use in bread making and has special reference to the preparation of a composition for use in carrying out the process of bread making set forth in and covered by the patents granted to me August 13, 1907, and numbered 862,962 and 863,021.

The object of the present invention is to prepare and place on the market in suitable form a composition of the character referred to whereby the time of the baker is saved to a great extent in preparing the sponge or dough for bread making and also whereby with very little instruction or directions an unskilled man could by the use of the prepared composition complete the operation of bread making without difficulty or danger of spoiling the materials and consequent spoiling of the bread.

My invention consists in the preparation of a composition of matter comprising the following ingredients: dry yeast about one half pound; acid potassium tartrate about one ounce; saccharine matter about four ounces; salt about two ounces, and about nine ounces of filler. When the baker desires to use this mixture or composition in completing the bread making process he simply mixes the same with about eleven pounds of water and eight pounds of flour and that mixture is allowed to ferment for about nine hours and is then used as a prepared sponge such as called for by my Patent No. 862,962, above mentioned. Certain of these ingredients may, if desired, be omitted from the original package such for instance as the salt, or the yeast, or the sugar, but it will be understood that in using such composition wherein these ingredients are omitted from the original package they would have to be added by the user in completing the preparation of the sponge.

In specifying sugar as one of the necessary constituents of the composition, it need not be the sugar of commerce such as sucrose commonly used for domestic purposes or the sugars present in glucose used for industrial purposes. The sugar could also be maltose either as present in malt or malt extract or derived from the action of malt upon starch or other convertible carbohydrate; or the maltose obtained by the action of diastase upon starch. In place of using sugar I could utilize malt flour, using sufficient of the malt flour or malt meal so as to give the necessary proportion of sugar.

A great advantage is obtained in having dry yeast as a part of the mixture for the reason that this makes the mixture invariable for all practical purposes. A car load or any quantity could be placed in storage and could be used at intervals as desired, giving a final batter sponge when used by the baker of uniform fermenting strength and with invariable quality and character, besides producing the yeast equivalent at a cost to the baker of twenty per cent. below the cost of compressed yeast used without organic acid combination and giving better flavor to the bread.

It would, of course, be possible and at times it may be desirable to omit the salt from the original composition and leave the baker to add the necessary salt when making up the bread.

Various other amounts of the different ingredients may at times be utilized to advantage but the relative amounts used will always be substantially the same.

If desired the dry yeast may be omitted from the composition as originally prepared and put up, and then when the baker desires to use the composition in making his sponge or dough he adds compressed yeast in the required amount.

For convenience in handling it may be desirable at times to put up the composition in the form of tablets, cakes or the like. This would be practical and all that would be necessary would be to press, by any suitable means, the mixture into cake form. The presence of the salt in the mixture tends to cause the package to take up moisture from the air especially so where the air is excessively humid. This could be avoided or prevented by inclosing the composition in a wrapper designed to exclude the air. When compressed into cake form the dry yeast would be coarsely ground, removing the powdered yeast cake and retaining the granular particles only, because the powdered yeast cake would come into too intimate contact with the salt. Then part of the sugar should be converted into a thick syrup, this should be mixed with the warmed ingredients of the composition and under pressure either as a sheeted dough or pressed into individual cakes would cause a cementing of the whole by reason of the syrup filling the interstices or crevices between the varied sized particles making up the mass. At the same time, however, there would be commercial conditions that might make it best to pack the loose mixture in powder or granular form into paper sacks or other form of package.

I have discovered that if I add a small proportion of certain mineral or organic acid or acid salt to the composition that this acts at once upon the gluten of the flour when used in bread making rendering it elastic, and, therefore, doing away with the necessity of permitting the unrestrained and uncontrolled growth of souring bacteria. The best acid or acid salt thus far discovered by me for this purpose is acid potassium tartrate and hence I have specified that acid in my compound. However, I have in my experience discovered that in lieu of the acid potassium tartrate which I mention above and have included as an element of my claims, I may use sulfuric acid, acid potassium sulfate, hydrochloric acid, tartaric acid, acid sodium tartrate, acetic acid, lactic acid, butyric acid, succinic acid, oleic acid, as well as mixtures of these acids, and obtain equally good results, any of said acids being for the purposes hereof considered as equivalents of each other as well as of the acid potassium tartrate, the particular acid to be used in a given case depending upon the character of the flour used in the process of completing the bread making.

It will be apparent, of course, to those skilled in the art that other acids may be used to accomplish the same result, and I, therefore, do not limit myself to the particular acids specifically named herein. Whatever acid is used, it is apparent that such acid should be free from microbes, including the acid forming bacteria. The ordinary sponge commonly used by bakers as part of the process of bread making for some breads contains a relatively large proportion of lactic acid, which has been formed by lactic acid bacteria; these bacteria continue the formation of acid after the sponge has been mixed into dough, sometimes forming such an excess of acid as to make the bread unfit for use as food. It is to obviate the formation of excessive acidity in the dough that I purpose adding the proper proportion of acid, permitting all the required chemical action upon the gluten of the flour, and forming a favorable acid medium for yeast fermentation without the addition of acid forming bacteria.

By the use of the composition prepared as specified many of the difficulties and uncertainties connected with bread making are avoided, as said difficulties and uncertainties are founded upon disregard of the fact that acids are necessary to effect the changes in the dough, and consequently fermentation is conducted upon such conditions as to form the acid slowly by means of microbic activity over which the baker is unable to exercise due control for the production of uniform results. By the use of my prepared composition this uncertainty is dispensed with and the baker is enabled to control the chemical changes and make bread free from sourness and other objectionable qualities and incidentally effect economy of labor and ingredients used for bread making.

Having thus fully described my invention, what I claim as new and desire to secure by Letters Patent of the United States, is:—

1. A composition of matter for use in bread making, containing acid potassium tartrate, dry yeast and saccharine matter in substantially the proportions specified.

2. A composition of matter for use in bread making consisting of acid potassium tartrate, saccharine matter, dry yeast, salt and a filler in substantially the proportions specified.

3. A composition of matter for use in bread making containing dry yeast and acid potassium tartrate in substantially the proportions specified.

4. A composition of matter for use in bread making containing acid potassium tartrate, dry yeast, saccharine matter and a filler, in substantially the proportions specified.

5. A composition of matter consisting of acid potassium tartrate, saccharine matter and a filler in substantially the proportions specified suitable for bread making when yeast is added thereto.

In testimony whereof I have signed my name to this specification in the presence of two subscribing witnesses.

DAVID CHIDLOW.

Witnesses:
 CHAS. E. RIORDON,
 E. L. WILLIAMS.